(12) United States Patent
Jindal et al.

(10) Patent No.: US 11,184,237 B2
(45) Date of Patent: Nov. 23, 2021

(54) ON-DEMAND TOPOLOGY CREATION AND SERVICE PROVISIONING

(71) Applicant: VMWARE, INC., Palo Alto, CA (US)

(72) Inventors: Gaurav Jindal, Pune (IN); Rasik Jesadiya, Pune (IN)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 16/819,219

(22) Filed: Mar. 16, 2020

(65) Prior Publication Data

US 2021/0226847 A1 Jul. 22, 2021

(30) Foreign Application Priority Data

Jan. 16, 2020 (IN) .............................. 202041001951

(51) Int. Cl.
*H04L 12/24* (2006.01)
*H04L 29/08* (2006.01)
*H04L 29/12* (2006.01)

(52) U.S. Cl.
CPC ...... *H04L 41/0853* (2013.01); *H04L 41/0806* (2013.01); *H04L 41/12* (2013.01); *H04L 41/5054* (2013.01); *H04L 61/2007* (2013.01); *H04L 67/16* (2013.01)

(58) Field of Classification Search
CPC . H04L 45/64; H04L 41/0853; H04L 41/0806; H04L 41/12; H04L 41/5054; H04L 61/2007; H04L 67/16
See application file for complete search history.

(56) References Cited

U.S. PATENT DOCUMENTS

| | | | | |
|---|---|---|---|---|
| 10,826,768 | B2* | 11/2020 | Britt | G06F 9/5072 |
| 2003/0135596 | A1* | 7/2003 | Moyer | H04L 41/022 709/223 |
| 2003/0146929 | A1* | 8/2003 | Baldwin | G06F 3/0481 715/733 |
| 2014/0115126 | A1* | 4/2014 | Nam | H04L 45/66 709/220 |
| 2018/0019920 | A1* | 1/2018 | Agarwal | H04L 41/0846 |

* cited by examiner

*Primary Examiner* — Andrew C Georgandellis
(74) *Attorney, Agent, or Firm* — Patterson + Sheridan, LLP

(57) ABSTRACT

The disclosure provides an approach for service provisioning. Embodiments include receiving first configuration data related to a first network endpoint and second configuration data related to a second network endpoint. Embodiments include generating a service map based on the first configuration data and the second configuration data. Embodiments include receiving a request to provision a service between the first network endpoint and the second network endpoint. Embodiments include determining in response to the request and based on the service map, first service configuration data for the first network endpoint and second service configuration data for the second network endpoint. Embodiments include provisioning the service between the first network endpoint and the second network endpoint by pushing the first service configuration data to the first network endpoint and pushing the second service configuration data to the second network endpoint.

20 Claims, 7 Drawing Sheets

ON-DEMAND TOPOLOGY CREATION AND SERVICE PROVISIONING

RELATED APPLICATIONS

Benefit is claimed under 35 U.S.C. 119(a)-(d) to Foreign Application Serial No. 202041001951 filed in India entitled "ON-DEMAND TOPOLOGY CREATION AND SERVICE PROVISIONING" on Jan. 16, 2020, by VMWARE, Inc., which is herein incorporated in its entirety by reference for all purposes.

BACKGROUND

Data centers generally include computing devices such as servers connected to form a network. For instance, host devices in a data center may run virtual computing instances (VCIs), such as virtual machines, containers, etc., that exchange network traffic with one another and with other endpoints (e.g., servers) outside of the data center. Software defined networking (SDN) comprises a plurality of hosts in communication over a physical network infrastructure, each host having one or more VCIs that are connected to logical overlay networks that may span multiple hosts and are decoupled from the underlying physical network infrastructure. Computing entities (e.g., physical computing devices, VCIs, etc.) may send requests and responses (e.g., in client-server architectures), such as via application programming interfaces (APIs) provided by services running on the computing entities.

One common characteristic of software defined networking is a separation of the control plane from the data plane. The control plane is concerned with determining the logical overlay network topology and maintaining information about network entities such as logical switches, logical routers, and endpoints, etc. The logical topology information is translated by the control plane into network configuration data that is then communicated to network elements of each host. The network configuration data, for example, includes forwarding table entries to populate forwarding tables at virtual switche(s) provided by the hypervisor (i.e., virtualization software) deployed on each host. In some cases, the control plane may need to transmit the network configuration data, or other types of data, to one or more VMs running on the virtualization software of a host.

When an endpoint or service is added to a network, configuration parameters for the endpoint or service must be chosen in view of existing endpoints and services in order to ensure that there are no conflicts. For example, when a network administrator adds a new virtual private network (VPN) service between two VCIs, interne protocol (IP) addresses allocated for the VPN service (e.g., IP addresses assigned to each of the two VCIs for the VPN) must be chosen so as not to conflict with IP addresses allocated to existing services, such as in a logical overly network. This can be a time-consuming process, particularly when networks include large numbers of endpoints and services.

SUMMARY

Embodiments provide a method of service provisioning. Embodiments include: receiving, by a service provisioning appliance, first configuration data related to a first network endpoint and second configuration data related to a second network endpoint; generating, by the service provisioning appliance, a service map based on the first configuration data and the second configuration data; verifying, by the service provisioning appliance, based on the service map, that no conflicts exist between the first configuration data and the second configuration data; receiving, by the service provisioning appliance, a request to provision a service between the first network endpoint and the second network endpoint; determining, by the service provisioning appliance, in response to the request and based on the service map, first service configuration data for the first network endpoint and second service configuration data for the second network endpoint by using the service map to select non-conflicting configuration parameters; and provisioning, by the service provisioning appliance, the service between the first network endpoint and the second network endpoint by: pushing the first service configuration data to the first network endpoint; and pushing the second service configuration data to the second network endpoint Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for on-demand topology creation and service provisioning. In certain embodiments, a service provisioning appliance provides an interface that allows a user, such as a network administrator, to define a network topology, including defining services to be provisioned. The user is enabled, for example, to drag and drop graphical icons representing multiple endpoints from multiple data centers to a canvas to form a topology definition and to identify services to be provisioned at the different endpoints. In some embodiments, endpoints include physical and/or virtual computing components, such as VMs, routers, gateways, servers, and the like. Services can include, for example, an interne protocol security (IP-Sec) virtual private network (VPN), a route based VPN, and the like.

In certain embodiments, the service provisioning appliance, which may be a virtual or physical component, automatically implements topologies and/or service provisioning requests input via the interface. For a given topology, the service provisioning appliance verifies that there are no issues that would prevent the given topology from being implemented, such as configuration conflicts. For example, if a topology involves connecting two data centers that were not previously connected, the service provisioning appliance determines whether there are any conflicting public IP addresses between the two data centers. If there is an issue, the service provisioning appliance may notify the user of the issue, suggest configuration changes to resolve the issue, and/or automatically modify configuration values to resolve the issue (e.g., by changing IP addresses at one of the data centers to non-conflicting values).

In certain embodiments, once verified, the service provisioning appliance implements the topology according to the topology definition, such as by pushing configuration data to endpoints within the network in order to establish connections indicated in the topology definition. In some embodiments, the service provisioning appliance generates a service map in order to keep track of which services are running at each endpoint in the topology, as well as the configurations of those services. When a request to provision a new service is received, the service provisioning appliance uses the service map to determine configuration values for the new service that do no conflict with configuration values of existing services, such as by selecting IP address ranges for the new service that do not conflict with existing IP address ranges that are assigned to other services. The service provisioning appliance then pushes the configuration data for the new service to each endpoint to which the service relates, such as two VMs that are to be connected by a VPN service. As such, the service provisioning appliance automatically implements the user's request to provision the new service within the topology.

Figure 1:
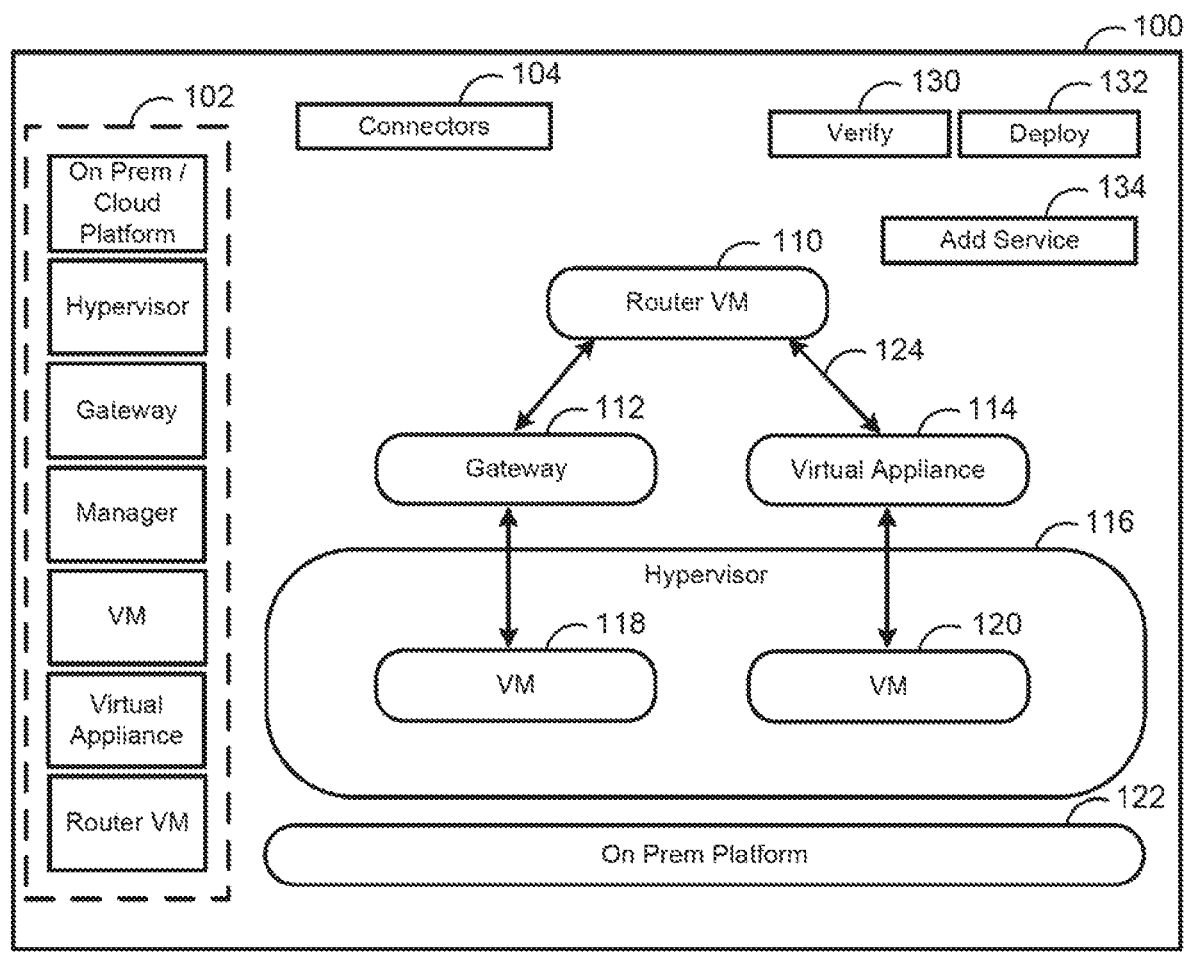
FIG. 1 depicts a management interface for managing network endpoints.

FIG. 1 depicts a management interface 100 for managing network endpoints, in accordance with certain embodiments. In some embodiments, management interface 100 is provided by a service provisioning appliance (e.g., service provisioning appliance 250 of FIG. 2, which may reside in a management component or alternatively may be a stand-alone appliance VM or Software as Service (SaaS) model that can communicate with all management components and also have network reachability to register endpoints) that performs on-demand topology creation and service provisioning.

Management interface 100 comprises a plurality of user interface elements that allow a user to define topologies and request provisioning of services. Icons 102 include graphical icons or other indicia, which represent various network components, that can be dragged and dropped into a canvas that contains a diagram representing a topology definition. Icons 102 include platforms (e.g., on-premise cloud platforms), hypervisors, controllers, managers, virtual machines (VMs), virtual appliances, and router VMs. These components are included as examples, and other types of components may be included within icons 102. When a user drags an icon 102 onto the canvas, the user may be prompted to provide information related to the component represented by the icon 102, such as configuration data (e.g., a configuration file) for the component.

In one example, the user drags on premise (on prem) platform icon 122 from icons 102 onto the canvas. Platform icon 122 may be associated with a configuration file for the platform represented by the icon 122. In some embodiments, the platform may be either an on prem or cloud infrastructure on which various components are deployed. In this case, on prem platform icon 122 represents an on prem infrastructure, such as data center 230 of FIG. 2. The user drags and drops additional icons, including hypervisor icon 116, VM icons 118 and 120, gateway icon 112, virtual appliance icon 114, and router VM icon 110 onto the topology. In addition, the user can define connections between the components represented by icons using connectors 104. In some embodiments, VM icon 118 represents VM $235_1$ of FIG. 2, VM icon 120 represents VM $235_2$ of FIG. 2, router VM icon 110 represents router VM $235_3$ of FIG. 2, virtual appliance icon 114 represents virtual appliance $235_4$ of FIG. 2, gateway icon 112 represents gateway 234 of FIG. 2, and hypervisor icon 116 represents hypervisor 216 of FIG. 2. Connections between icons in the topology diagra, such as connection 124, may be defined by selecting connectors 104 and dragging and dropping the connector between two icons representing different endpoints.

Once the topology has been defined according to the topology diagram and additional configuration information, the user may select verify control 130 in order to initiate a verification process. In some embodiments, the service provisioning appliance verifies that the topology can be successfully provisioned without any configuration errors or conflicts. A conflict may be detected, for instance, if public IP addresses associated with services that are currently provisioned and components included in the topology definition conflict with one another. If verification fails, the user may be notified and prompted to revise the topology definition. The user may also be provided with recommended changes to correct a conflict, or changes may be automatically made by the service provisioning appliance (e.g., by pushing out revised configuration data to components). Changes may include, for example, modifying a configuration file for a VM to assign different IP addresses for a service that do not conflict with IP addresses assigned to another service in the topology definition.

When the topology definition has been verified, the service provisioning appliance may deploy a new topology according to the topology definition. For instance, the user may select the deploy control 132 in order to initiate deployment. Deployment generally involves pushing configuration data to various components in order to establish connectivity. For instance, the service provisioning appliance may generate configuration data for router VM $235_3$ and virtual appliance $235_4$ of FIG. 2 based on connector 124 placed between router VM icon 110 and virtual appliance icon 114 in the topology diagram. In an example, the configuration data is generated by modifying existing configuration data (e.g., provided by the user, a different user, an orchestration tool or other automated system, or default configuration data) for router VM $235_3$ and virtual appliance $235_4$ of FIG. 2 in order to establish network connectivity between the two components. In some embodiments, the service provisioning appliance provides configuration data to a controller of a control plane, which pushes the configuration data to individual components in appropriate formats.

The service provisioning appliance generates a service map based on services currently running within the topology. The service map indicates which endpoints are connected by which services and, in some embodiments, includes IP addresses that are associated with the endpoints for the services. Service maps are described in more detail below with respect to FIGS. 4 and 5.

The user may request a service to be provisioned within the topology, such as by selecting the add service control 134. Services and endpoints (e.g., hypervisors or gateways) may have been previously registered as described below with respect to FIG. 3B, and all registered services and endpoints may be displayed as options for the user to select.

In some embodiments, the user selects endpoints within the topology and then provides information related to a service that the user is requesting to be provisioned between the endpoints (e.g., the user may select a registered service to provision between the endpoints). In certain embodiments, the user drags and drops a service (e.g., from a list displayed after selecting add service control 134) onto the topology definition. In one example, the user drops a service onto a given icon representing a first endpoint in the topology definition, and then identifies a second endpoint to be connected to the first endpoint via the service, such as by selecting an icon representing the second endpoint or by providing an identifier of the second endpoint. If the service provisioning appliance determines that the service already exists based on the service map, then no further action is needed. If the service provisioning appliance determines that the service does not yet exist, it generates configuration data for the selected endpoints (e.g., hypervisors, virtual appliances, or gateways) in order to provision the service thereon. The configuration data may, for example, be generated based on a vendor type of each of the endpoints and configuration templates associated with vendor types. In some embodiments, the user provides vendor types and associated configuration templates in advance, and these are accessed by the service provisioning engine. For instance, the user may register each vendor type and configuration template by providing them via additional elements (not shown) of interface 100. A configuration template may include specific parameters that need to be set for the given vendor type.

The service provisioning appliance selects configuration values, such as IP addresses, encryption algorithms, authorization algorithms, and the like, for the service (e.g., to enter into the appropriate configuration template) that do not conflict with other configuration values in the topology. The service provisioning appliance uses the service map to identify existing configuration values, such as existing IP addresses, and selects configuration values for the service that do not overlap with the existing configuration values. This may be done by, for example, selecting the first sequential IP addresses that are not already assigned to other services. The service is then provisioned by pushing the configuration data out to the endpoints, such as via the controller.

In some embodiments, provisioning a new service requires deploying a new virtual appliance, such as a service VM (SVM). In these cases, the virtual appliance is created and then connected according to the topology definition. For example, the service provisioning appliance may instruct a management component to deploy the virtual appliance (e.g., by cloning an existing VM), providing the management component with configuration information for the virtual appliance, in order to provision the service. The service provisioning appliance may then instruct the management component to configure any routers, switches, and the virtual appliance itself as needed to place the virtual appliance in the datapath according to the topology definition.

Once the service is active, the service provisioning appliance updates the service map to include details of the service. As such, the configuration data of the service will be taken into account for provisioning of future services in order to ensure non-conflicting configurations.

Figure 2:
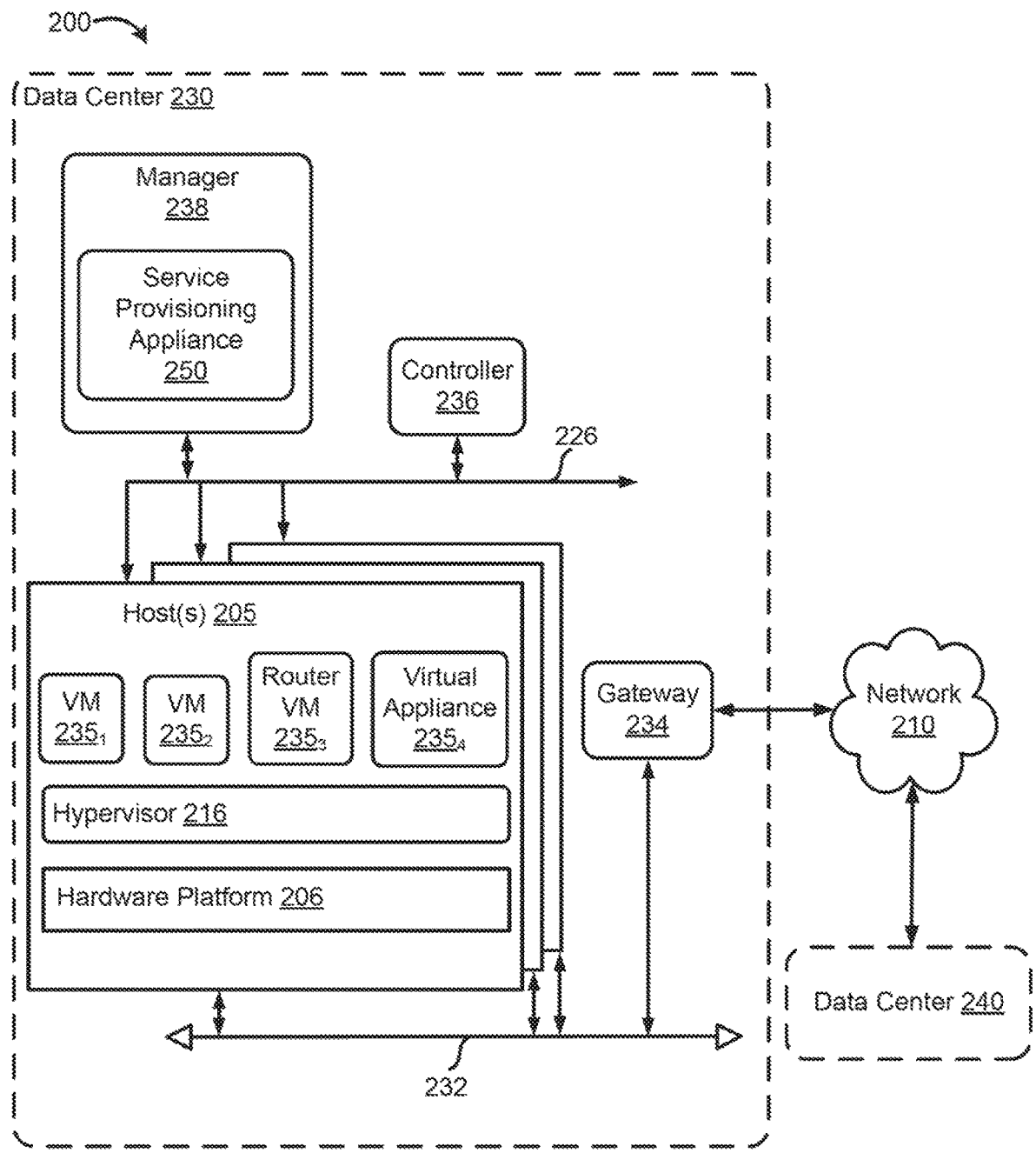
FIG. 2 depicts example physical and virtual network components with which embodiments of the present disclosure may be implemented.

FIG. 2 depicts example physical and virtual network components with which embodiments of the present disclosure may be implemented.

Networking environment 200 includes data centers 230 and 240 connected to network 210. Network 210 is generally representative of a network of computing entities such as a local area network ("LAN") or a wide area network ("WAN"), a network of networks, such as the Internet, or any connection over which data may be transmitted.

Data center 230 generally represents a set of networked computing entities, and may comprise a logical overlay network. Data center 130 includes host(s) 205, a gateway 234, a data network 232, which may be a Layer 3 network, and a management network 226. Data network 232 and management network 226 may be separate physical networks or different virtual local area networks (VLANs) on the same physical network. Data center 240 may include similar components to those depicted in data center 230.

Each of hosts 205 may be constructed on a server grade hardware platform 206, such as an x86 architecture platform. For example, hosts 205 may be geographically co-located servers on the same rack or on different racks. Host 205 is configured to provide a virtualization layer, also referred to as a hypervisor 216, that abstracts processor, memory, storage, and networking resources of hardware platform 206 into multiple virtual computing instances (VCIs) $235_1$ to $235_4$ (collectively referred to as VCIs 235 and individually referred to as VCI 235) that run concurrently on the same host. VCIs 235 include VMs $235_1$ and $235_2$, router VM $235_3$, and virtual appliance $235_4$.

Hypervisor 216 may run in conjunction with an operating system (not shown) in host 205. In some embodiments, hypervisor 216 can be installed as system level software directly on hardware platform 206 of host 205 (often referred to as "bare metal" installation) and be conceptually interposed between the physical hardware and the guest operating systems executing in the virtual machines. In some implementations, hypervisor 216 may comprise system level software as well as a "Domain 0" or "Root Partition" virtual machine (not shown) which is a privileged machine that has access to the physical hardware resources of the host. In this implementation, one or more of a virtual switch, virtual tunnel endpoint (VTEP), etc., along with hardware drivers, may reside in the privileged virtual machine. Although the disclosure is described with reference to VMs, the teachings herein also apply to other types of VCIs or data compute nodes (DCNs), such as containers, which may be referred to as Docker containers, isolated user space instances, namespace containers, etc. In certain embodiments, VCIs 235 may be replaced with containers that run on host 205 without the use of a hypervisor.

Gateway 234 provides VCIs 235 and other components in data center 230 with connectivity to network 210, and is used to communicate with destinations external to data center 230, such as data center 240. Gateway 234 may be a virtual computing instance, a physical device, or a software module running within host 205, such as an edge service gateway (ESG).

Controller 236 generally represents a control plane that manages configuration of VCIs 235 within data center 230. Controller 236 may be a computer program that resides and executes in a central server in data center 230 or, alternatively, controller 236 may run as a virtual appliance (e.g., a VM) in one of hosts 205. Although shown as a single unit, it should be understood that controller 236 may be implemented as a distributed or clustered system. That is, controller 236 may include multiple servers or virtual computing instances that implement controller functions. Controller 236 is associated with one or more virtual and/or physical CPUs (not shown). Processor(s) resources allotted or assigned to controller 236 may be unique to controller 236, or may be shared with other components of data center 230. Controller 236 communicates with hosts 205 via management network 226.

Manager 238 generally represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In some embodiments, service provisioning appliance 250 resides within manager 238 or is associated with manager 238. In other embodiments, the service provisioning appliance runs on a separate computing device, such as a server (not shown), within data center 230 or data center 240. In certain embodiments, the service provisioning appliance is a VCI within a host, such as one of hosts 205, or is a component separate from both data centers 230 and 240. In some embodiments, the service provisioning appliance is a standalone VCI or SaaS model that can communicate with management components and has network reachability to register endpoints that are not created by the service provisioning appliance.

A user may interact with an interface provided by the service provisioning appliance, such as interface 100 of FIG. 1 in order to define topologies and provision services with respect to components of data centers 230 and 240.

Figure 3A:
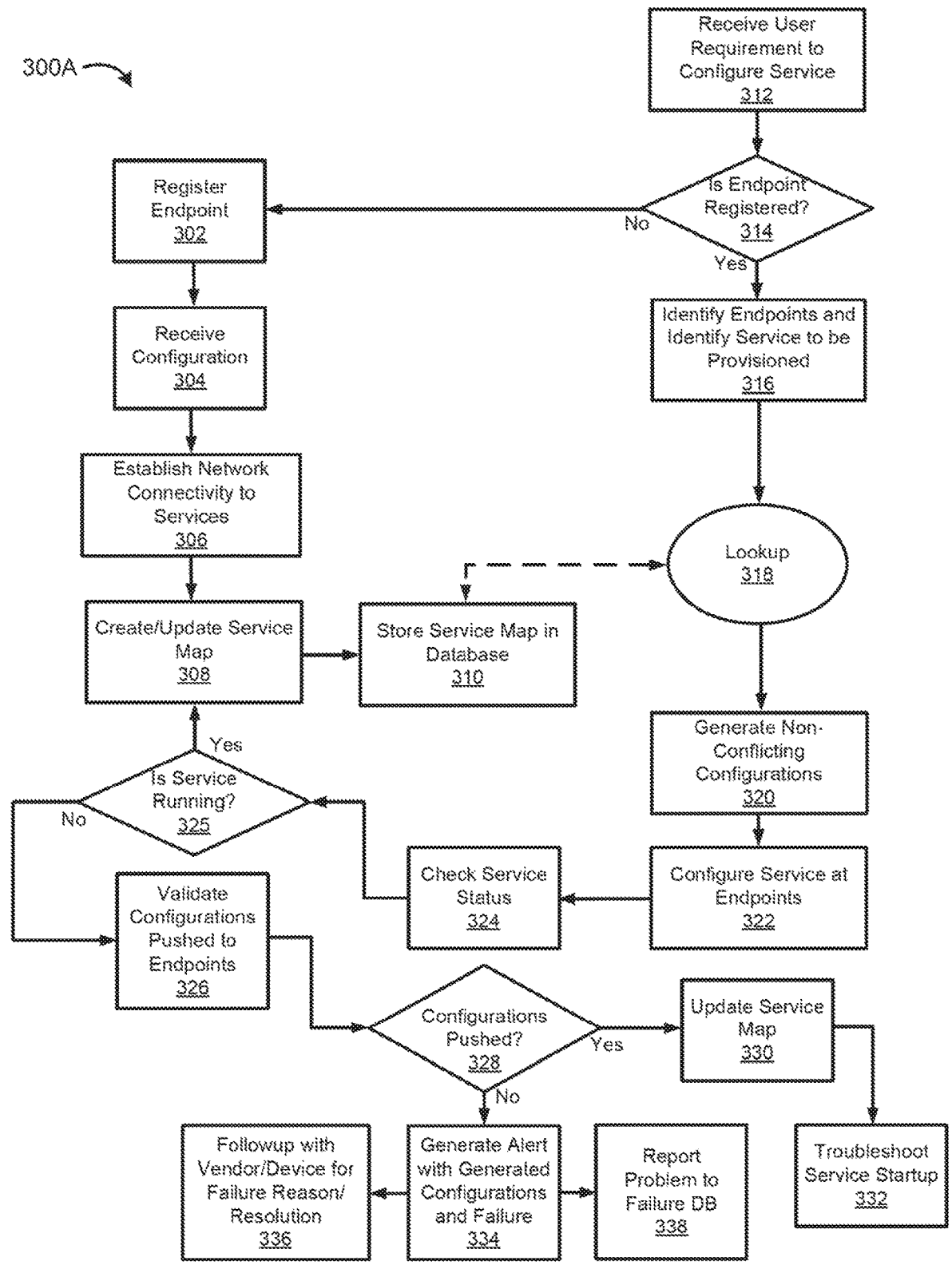
FIG. 3A depicts an example flowchart for service provisioning according to embodiments of the present disclosure.

FIG. 3A depicts an example flowchart 300A for service provisioning according to embodiments of the present disclosure.

At step 302, an endpoint is registered. For example, a user may request registration of the endpoint through interaction with interface 100 of FIG. 1, such by dragging and dropping an icon 102 of a particular type (e.g., VM icon 118 of FIG. 1) onto a canvas. The endpoint may be, for instance, a VM. In some embodiments, the user provides configuration data in step 304 for the endpoint, such a configuration file, at the time of registration. A configuration file may, for instance, be an open virtualization format (OVF) file that includes a name, hardware requirements, certificates, disk images, and other data related to a VCI. In some embodiments, such as when the endpoint is newly created by the service provisioning appliance at the time a topology is provisioned, registration of the endpoint is performed automatically by the service provisioning appliance when the topology is provisioned. The user (e.g., administrator) can also register an endpoint that is not created by the service provisioning appliance. Network reachability is needed to register and connect to the endpoint. In such cases, at time of registration, the service provisioning appliance will read the endpoint configuration and employ techniques described herein to provision existing services for the endpoint and update a service map. After adding this outside endpoint (e.g., endpoint not created by the service provisioning appliance) and after updating the service map, service provisioning can be performed for this newly added outside endpoint using techniques described herein.

At step 306, network connectivity is established to services. For example, a service provisioning appliance (e.g., service provisioning appliance 250 of FIG. 2) may establish network connectivity for services between the endpoint registered at steps 302 and 304 and one or more other endpoints to which the endpoint is connected in a topology. In an example, a service provisioning appliance determines existing services of the endpoints in the topology based on the configuration data received at step 304, and ensures that the configurations of the existing services are not in conflict. If configurations are in conflict, the user is notified and, in some embodiments, provided with recommended configuration changes to resolve the conflict. Once the service provisioning appliance determines that configurations of the existing services are not in conflict, it establishes service connectivity, such as through interaction with a controller.

At step 308, a service map is created. For example, the service map may indicate all services currently running, as well as the endpoints that are connected by each service. In some embodiments the service map also includes IP addresses associated with each service, while in other embodiments the service map is used by the service provisioning appliance to access the IP addresses associated with each service (e.g., from the controller). The service map may include information about services running at all endpoints in the network, and not just endpoints in the topology definition from the user. For example, the service provisioning appliance may receive information about all services running in the network from the manager, such as via the controller, and may use this information in generating the service map.

At step 310, the service map is stored in a database.

At step 312, a user requirement to configure a service is received. For instance, a user may select two endpoints in a topology in interface 100 and indicate a service to be provisioned, such as by selecting add service control 134 and identifying a type of service to provision between the two endpoints.

At step 314 a determination is made as to whether each endpoint identified at step 312 has been registered. If both endpoints are registered, then operations proceed to step 316. If a given endpoint is not registered, then operations proceed to step 302, where the endpoint is registered. An endpoint may not be registered, for example, if the user drags a new endpoint icon onto the canvas as one of the endpoints connected to the service. In this case, steps 302, 304, 306, 308, and 310 are performed to register the new endpoint.

At step 316, the endpoints are identified and the service to be provisioned is identified. For example, the service provisioning appliance may use the information provided at step 312 to identify which endpoints are represented by the icons selected by the user and identify the service to provision based on the indication provided by the user.

At step 318, a lookup is performed on the service map stored in the database. For example, the service provisioning appliance may access the service map to determine which configuration parameters, such as IP addresses, are currently assigned to existing services in the topology.

At step 320, non-conflicting configurations are generated for the endpoints in order to provision the service. For example, the service provisioning appliance may select IP addresses for each of the endpoints for the service based on the lookup performed at step 318. In one embodiment, the service provisioning appliance sequentially selects the first IP addresses that are not assigned to existing services. In some embodiments, the service provisioning appliance generates the non-conflicting configurations by using configuration templates associated with the vendors of the endpoints, and populates the templates with the non-conflicting parameters, such as IP addresses.

At step 322, the endpoints are configured in order to provision the service. In some embodiments, the service provisioning appliance pushes the configurations generated at step 320 to the endpoints, such as by sending the configurations to the controller for distribution to the endpoints.

At step 324, a status of the service is checked to determine whether the service is running. At step 325, a determination is made as to whether the service is running. If the service is running, operations proceed to step 308, where the service map is updated to indicate that the service is running between the endpoints. If the service is not running, operations proceed to step 326.

At step 326, a validation process for ensuring that the configurations were pushed to the endpoints. At step 328, it is determined whether the configurations were pushed to the endpoints. This may be performed, for example, by requesting confirmation from the endpoints that the configurations were received. If the configurations were pushed, then operations proceed to step 330, where the service map is updated to reflect that the service is running at the endpoints, and then step 332, where a troubleshooting process for the service startup is performed (e.g., because the configurations were pushed but the services were not properly initialized). For instance, the troubleshooting may involve input from an administrator, performing automated tests, and/or the like. If the configurations were not pushed, then operations proceed to step 334.

At step 334, an alert is generated with the configurations and the failure. For example, the alert may be provided to an administrator, and may include the configurations generated at step 320 and information about the failure to push the configurations to the endpoints. At step 336, a follow-up is performed with the vendor and/or device (e.g., endpoint) to determine a reason for the failure and/or to determine whether the failure has been resolved. The follow-up may involve, for instance, sending a message requesting this information from the vendor and/or device that caused the failure. At step 338, the problem is reported to a failure database. For example, a problem report may be entered into a database that tracks failures in the networking environment.

Figure 3B:
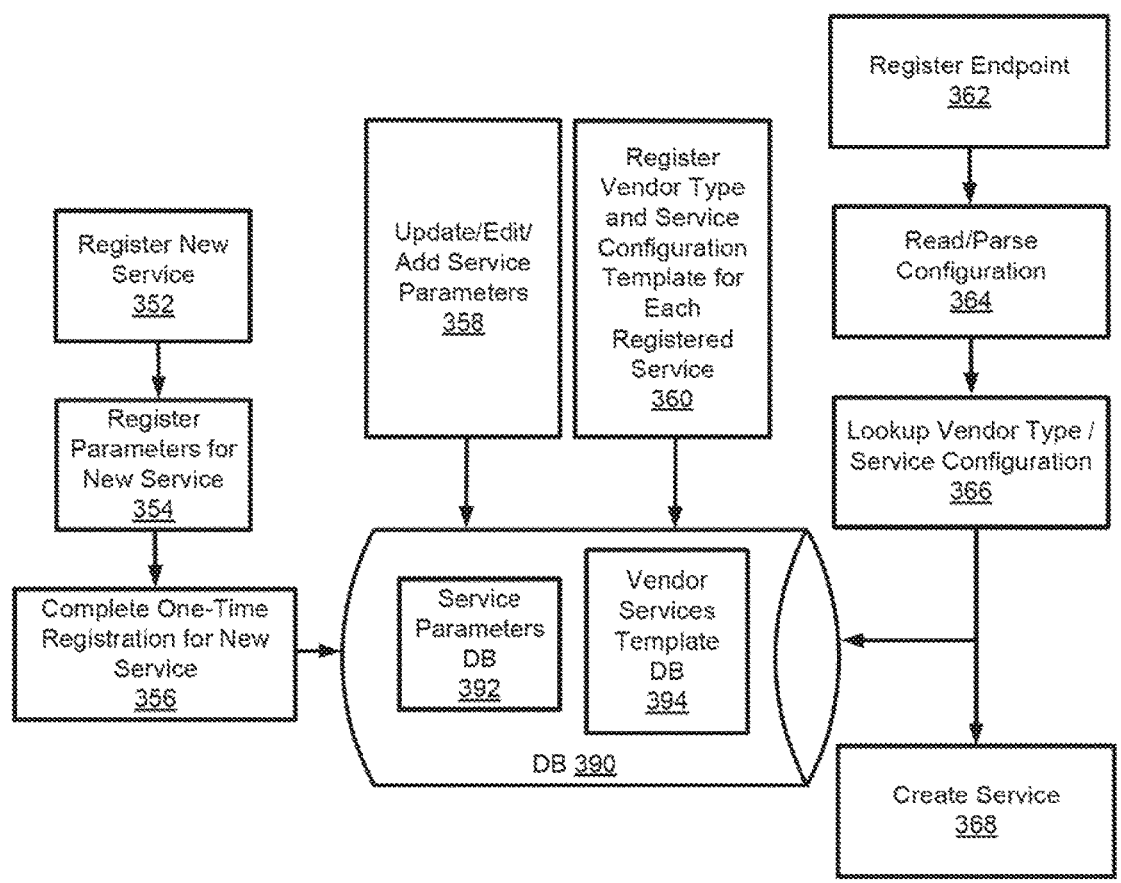
FIG. 3B depicts an example flowchart for service registration according to embodiments of the present disclosure.

FIG. 3B depicts an example flowchart 300B for service registration according to embodiments of the present disclosure.

At step 352, a new service is registered. For example, a user may initiate a registration process for a new service through interaction with interface 100 of FIG. 1.

At step 354, parameters for the new service are registered. For example, the user may provide a plurality of parameters for the new service, including min and max values, ranges, parameter types, values, indicators of whether parameters are optional or mandatory, and/or the link.

At step 356, a one-time registration is completed for the new service by storing the information about the new service, including the parameters, in a database 390. In certain embodiments, the parameters are stored in a service parameters database 392.

At step 358, service parameters are updated, edited, or added to database 390. For example, a user may modify parameters of a service and provide updated and/or additional parameters for storage in service parameters database 392.

At step 360, vendor types and service configuration templates are registered for each registered service. For instance, the user may identify vendor types and provide configuration templates for the vendor types for each registered service, and the configuration templates for vendor types may be stored in vendor services template database 394.

At step 362, an endpoint is registered. For example, a user may initiate a process for registering an endpoint through interaction with interface 100 of FIG. 1, and may provide configuration information for the endpoint.

At step 364, configuration information for the endpoint is read and parsed, such as to determine services that need to be provisioned for the endpoint.

At step 366, vendor type and service configuration information is looked up in database 390. For example, a configuration template for a vendor type of the endpoint may be retrieved from vendor services template database 394 and populated with values from the configuration information provided by the user for the endpoint.

At step 368, a service is created. For example, the service may be provisioned using the configuration template retrieved at step 356 by pushing the populated configuration template to the endpoint.

Figure 4:
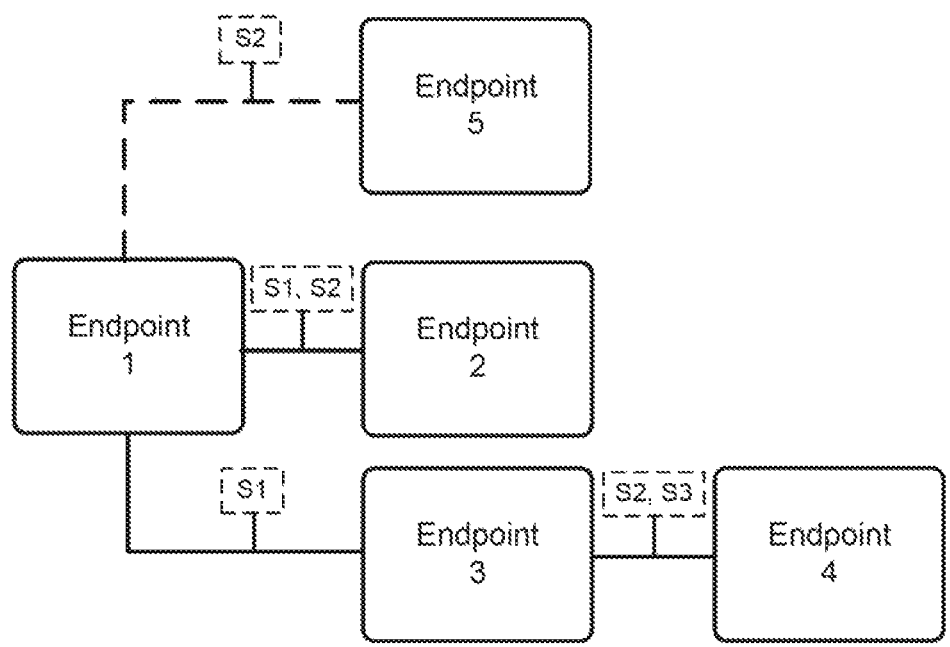
FIG. 4 depicts an example of endpoints and services according to embodiments of the present disclosure.

FIG. 4 depicts an example 400 of endpoints and services according to embodiments of the present disclosure.

Endpoints 1, 2, 3, 4, and 5 generally represent endpoints connected in a topology, such as VCIs. In one example, endpoint 1 represents gateway 234 of FIG. 2, and endpoints 2-5 represent other VCIs running on hosts 205 of FIG. 2. A number of services S1, S2, and S3 are running between endpoints 1, 2, 3, and 4, and may be existing services that are running at a time that the topology was defined by a user, such as via interface 100 of FIG. 1. Each of services S1, S2, and S3 may represent, for example, an IPSec VPN connection, a route based VPN connection, or the like. A user requirement to provision service S2 between endpoint 1 and endpoint 5 is received, such as via interface 100 of FIG. 1. Accordingly, a service map is used to determine non-conflicting configurations for endpoint 1 and endpoint 5 to provision S2 between them.

Figure 5:
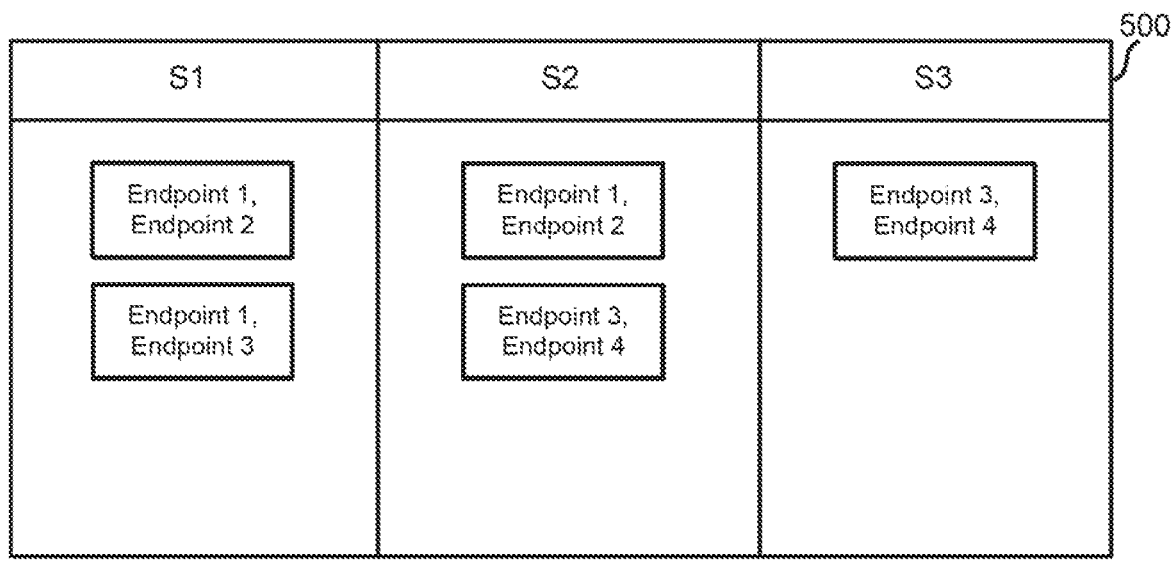
FIG. 5 depicts an example service map according to embodiments of the present disclosure.

FIG. 5 depicts an example service map 500 according to embodiments of the present disclosure. Service map 500 is generated by a service provisioning appliance based on the services running between endpoints in example 400 of FIG. 4.

Service map 500 indicates that service S1 is running between endpoints 1 and 2 and also between endpoints 1 and 3.

Service map 500 indicates that service S2 is running between endpoints 1 and 2 and also between endpoints 3 and 4.

Service map 500 indicates that service S3 is running between endpoints 3 and 4.

While not shown, service map 500 may also include endpoint properties such as IP addresses assigned to each of services S1, S2, and S3. In one example, endpoint 1 is assigned a public IP address of 66.170.99.12, endpoint 2 is assigned a public IP address of 101.24.100.100, endpoint 3 is assigned a public IP address of 101.56.90.90, and endpoint 4 is assigned a public IP address of 40.40.1.20. Service S1 between endpoints 1 and 2 has a reserved IP address range of 169.254.60.1-30, while service S1 between endpoints 1 and 3 has a reserved IP address range of 169.254.67.1-30.

Service S2 between endpoints 1 and 2 has a reserved IP address range of 169.254.70.1-30, while service S2 between endpoints 3 and 4 has a reserved IP address range of 169.254.72.1-30. Service S3 between endpoints 3 and 4 has a reserved IP address range of 169.254.82.1-30.

As described in more detail below with respect to FIG. 6, the service provisioning appliance may select non-conflicting configuration values for provisioning service S2 between endpoints 1 and 5 based on service map 500.

Figure 6:
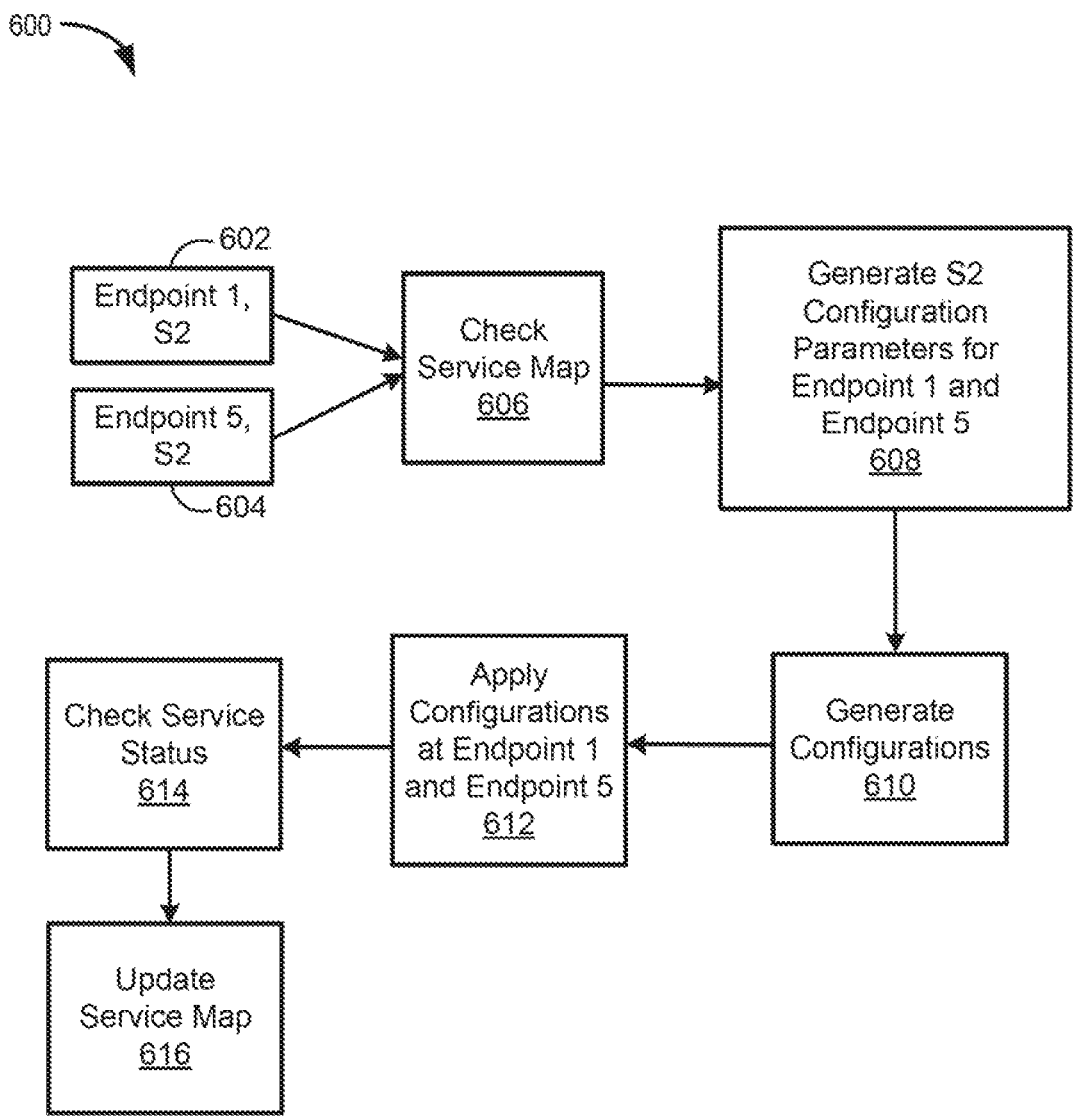
FIG. 6 depicts an example of service provisioning according to embodiments of the present disclosure.

FIG. 6 depicts an example 600 of service provisioning according to embodiments of the present disclosure. Example 600 may relate to provisioning service S2 between endpoints 1 and 5 of FIG. 4 based on service map 500 of FIG. 5.

At 602 and 604, endpoint 1 and endpoint 5 are identified as endpoints to be connected by service S2, such as based on input from a user via interface 100 of FIG. 1. At 606, a service map is checked. In some embodiments, a service provisioning appliance checks service map 500 of FIG. 5 to identify IP addresses that are currently assigned to existing services among endpoints 1-5 of FIG. 4.

At 608, service S2 configuration parameters are generated for endpoints 1 and 5. For example, an IP address range may be selected for service S2 between endpoints 1 and 5 that does not conflict with IP addresses assigned to other services. For example, the IP address range 169.254.61.1-30 may be selected, such as by determining the first sequential range of IP addresses not currently assigned to other services. This is only included as one example technique for selecting a non-conflicting IP address range, and other techniques may alternatively be used.

At 610, configurations are generated for endpoints 1 and 5 for service S2. In one example, a respective vendor of each of endpoints 1 and 5 is determined, and configuration templates associated with the respective vendor for each is populated based on the configuration parameters determined at 608. For example, the IP address range of 169.254.61.1-30 may be used to populate a configuration template for endpoint 1 with an IP address of 169.254.61.1 and a configuration template for endpoint 5 with an IP address of 169.254.61.2.

At 612, the configurations generated at 610 are applied to endpoints 1 and 5. For example, the configurations may be pushed to endpoints 1 and 5 via the controller.

At 614, the status of service S2 between endpoints 1 and 5 is checked. For example, the service provisioning appliance may check whether S2 is active between endpoints 1 and 5. If the service is active, then the service map is updated at 616 to reflect that service S2 is running between endpoints 1 and 5 (and, in some embodiments, the service map is updated to include the IP address range of 169.254.61.1-30 and/or the IP addresses of 169.254.61.1 and 169.254.61.2). If the service is not yet active, then the service provisioning appliance waits until it is active to update the service map.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of service provisioning, comprising:
   generating, by a service provisioning appliance, a service map based on first existing service configuration data related to a first network endpoint in a network and second existing service configuration data related to a second network endpoint in the network, wherein the service map indicates one or more connections established between endpoints in the network by one or more services;
   receiving, by the service provisioning appliance, a request to provision a service between the first network endpoint and the second network endpoint;
   determining, by the service provisioning appliance, in response to the request and based on the service map, first service configuration data for the first network endpoint and second service configuration data for the second network endpoint by:
      using the service map to determine one or more services related to the first network endpoint and the second network endpoint;
      determining one or more network addresses associated with the one or more services; and
      selecting at least one network address for the service that does not conflict with the one or more network addresses; and
   provisioning, by the service provisioning appliance, the service between the first network endpoint and the second network endpoint by:
      pushing the first service configuration data to the first network endpoint; and
      pushing the second service configuration data to the second network endpoint.

2. The method of claim 1, further comprising:
   receiving, by the service provisioning appliance, requested network topology data via a user interface, wherein the requested network topology data indicates a connection between the first network endpoint and the second network endpoint; and
   generating, by the service provisioning appliance, a network topology model based on the requested network topology data.

3. The method of claim 2, further comprising displaying the network topology model via the user interface, wherein the request to provision the service between the first network endpoint and the second network endpoint is received via the user interface in response to displaying the network topology model.

4. The method of claim 1, further comprising:
   detecting, by the service provisioning appliance, a conflict between the first existing service configuration data and the second existing service configuration data; and
   modifying, by the service provisioning appliance, the first existing service configuration data or the second existing service configuration data to resolve the conflict.

5. The method of claim 4, further comprising:
   generating, by the service provisioning appliance, a notification of the conflict; and
   receiving, by the service provisioning appliance, in response to the notification, an indication to resolve the conflict.

6. The method of claim 1, wherein determining the first service configuration data and the second service configuration data comprises determining one or more additional non-conflicting configuration parameters based on the service map.

7. The method of claim 1, wherein selecting the at least one network address for the service that does not conflict with the one or more network addresses comprises determining at least one internet protocol (IP) address that does not conflict with IP addresses associated with existing services indicated in the service map.

8. A system, comprising one or more processors and a non-transitory computer readable medium comprising instructions that, when executed by the one or more processors, cause the system to perform a method of service provisioning, the method comprising:
   generating, by a service provisioning appliance, a service map based on first existing service configuration data related to a first network endpoint in a network and second existing service configuration data related to a second network endpoint in the network, wherein the service map indicates one or more connections established between endpoints in the network by one or more services;
   receiving, by the service provisioning appliance, a request to provision a service between the first network endpoint and the second network endpoint;
   determining, by the service provisioning appliance, in response to the request and based on the service map, first service configuration data for the first network endpoint and second service configuration data for the second network endpoint by:
      using the service map to determine one or more services related to the first network endpoint and the second network endpoint;
      determining one or more network addresses associated with the one or more services; and
      selecting at least one network address for the service that does not conflict with the one or more network addresses; and
   provisioning, by the service provisioning appliance, the service between the first network endpoint and the second network endpoint by:
      pushing the first service configuration data to the first network endpoint; and pushing the second service configuration data to the second network endpoint.

9. The system of claim 8, wherein the method further comprises:
receiving, by the service provisioning appliance, requested network topology data via a user interface, wherein the requested network topology data indicates a connection between the first network endpoint and the second network endpoint; and
generating, by the service provisioning appliance, a network topology model based on the requested network topology data.

10. The system of claim 9, wherein the method further comprise displaying the network topology model via the user interface, wherein the request to provision the service between the first network endpoint and the second network endpoint is received via the user interface in response to displaying the network topology model.

11. The system of claim 8, wherein the method further comprises:
detecting, by the service provisioning appliance, a conflict between the first existing service configuration data and the second existing service configuration data; and
modifying, by the service provisioning appliance, the first existing service configuration data or the second existing service configuration data to resolve the conflict.

12. The system of claim 11, wherein the method further comprises:
generating, by the service provisioning appliance, a notification of the conflict; and
receiving, by the service provisioning appliance, in response to the notification, an indication to resolve the conflict.

13. The system of claim 8, wherein determining the first service configuration data and the second service configuration data comprises determining one or more additional non-conflicting configuration parameters based on the service map.

14. The system of claim 8, wherein selecting the at least one network address for the service that does not conflict with the one or more network addresses comprises determining at least one internet protocol (IP) address that does not conflict with IP addresses associated with existing services indicated in the service map.

15. A non-transitory computer readable medium comprising instructions that, when executed by one or more processors of a computer system, cause the computer system to perform a method of service provisioning, the method comprising:
generating, by a service provisioning appliance, a service map based on first existing service configuration data related to a first network endpoint in a network and second existing service configuration data related to a second network endpoint in the network, wherein the service map indicates one or more connections established between endpoints in the network by one or more services;
receiving, by the service provisioning appliance, a request to provision a service between the first network endpoint and the second network endpoint;
determining, by the service provisioning appliance, in response to the request and based on the service map, first service configuration data for the first network endpoint and second service configuration data for the second network endpoint by:
using the service map to determine one or more services related to the first network endpoint and the second network endpoint;
determining one or more network addresses associated with the one or more services; and
selecting at least one network address for the service that does not conflict with the one or more network addresses; and
provisioning, by the service provisioning appliance, the service between the first network endpoint and the second network endpoint by:
pushing the first service configuration data to the first network endpoint; and
pushing the second service configuration data to the second network endpoint.

16. The non-transitory computer readable medium of claim 15, wherein the method further comprises:
receiving, by the service provisioning appliance, requested network topology data via a user interface, wherein the requested network topology data indicates a connection between the first network endpoint and the second network endpoint; and
generating, by the service provisioning appliance, a network topology model based on the requested network topology data.

17. The non-transitory computer readable medium of claim 16, wherein the method further comprise displaying the network topology model via the user interface, wherein the request to provision the service between the first network endpoint and the second network endpoint is received via the user interface in response to displaying the network topology model.

18. The non-transitory computer readable medium of claim 15, wherein the method further comprises:
detecting, by the service provisioning appliance, a conflict between the first existing service configuration data and the second existing service configuration data; and
modifying, by the service provisioning appliance, the first existing service configuration data or the second existing service configuration data to resolve the conflict.

19. The non-transitory computer readable medium of claim 18, wherein the method further comprises:
generating, by the service provisioning appliance, a notification of the conflict; and
receiving, by the service provisioning appliance, in response to the notification, an indication to resolve the conflict.

20. The non-transitory computer readable medium of claim 15, wherein determining the first service configuration data and the second service configuration data comprises determining one or more additional non-conflicting configuration parameters based on the service map.

* * * * *